Patented Nov. 1, 1949

2,486,992

UNITED STATES PATENT OFFICE 2,486,992

PROCESS FOR MAKING ORGANO-SILICON COMPOUNDS

Frank J. Sowa, Cranford, N. J.

No Drawing. Application July 25, 1945,
Serial No. 607,100

9 Claims. (Cl. 260—448.2)

This invention relates in general to organo-silicon compounds and polymers thereof and in particular to a method for the preparation of the silanols and polymers thereof from substituted organo silanes.

Silanes of the type $R_ySi(OR')_z$ in which R represents an organic radical in which carbon is attached direct to the silicon and in which R' is an organic radical selected from the group consisting of aliphatic, aromatic, and heterocyclic radicals, are characterized by hydrolysing to yield silanols of the type $R_ySi(OH)_z$. Depending upon the number of OR' groups, the hydrolysis products contain, respectively, 1, 2 or 3 hydroxyl groups. I have discovered that the silanols condense with themselves and with other organic compounds to form a number of classes of valuable liquid and solid polymers.

It is apparent, therefore, that the hydrolysis of the substituted silicane is essential for the production of the commercially valuable polymers which have come to be known as silicones.

Heretofore, the only known method for hydrolysing the substituted silanes was by heating the silanes with water. Usually a large excess of water was employed and the product was, of course, dilute aqueous solution or dispersion of the silanols. It has therefore been necessary, in such prior hydrolysis processes, to separate large quantities of water before the hydrolysis product or its polymer could be removed. However, many uses of the silanols and of the polymers involve formation of the hydrolysis product (silanol) in situ on some material such as a textile fabric, paper, leather, and so forth. When hydrolysis is so performed, it is obvious that the material is wet with large quantities of water and that the material must be dried before a substantial polymerization of the hydrolysis product (silanol) takes place. Up to the present time there has been no method which enabled the silanol to be formed initially in the anhydrous or substantially anhydrous condition.

Moreover, it has been found that hydrolysis of the alkoxy silanes by heating with water is extremely slow even though the temperature and pressure is increased and even when an acid catalyst is present. For example, to polymerize di-amyl diethoxy silane, it is necessary to heat the compound in admixture with a large volume of water under pressure to a temperature of 180° C. To hydrolyse dibutyl dimethoxy silane, it is necessary to heat the compound in an excess of water while bubbling air through the solution. Moreover, it is desirable to remove the water to complete the polymerization of the silanols to poly siloxanes.

Accordingly, it is a general object of the present invention to provide a more simple and rapid method of forming anhydrous organo silanols.

A specific object of the invention is the provision of a method for the preparation of an organo silanol in a substantially anhydrous form without the necessity of separating it from a large quantity of water.

Another specific object of the invention is to provide a method for producing anhydrous silanols and polymers of alkoxy organo silanes in a simple and efficient manner.

Other objects of the invention will in part be obvious and will in part appear hereinafter.

I have now found that substituted organo silanes of the type $R_ySi(OR')_z$ may be converted directly into the corresponding anhydrous silicones, silanols and their polymers without heating the compound with water, that is, without employing hydrolysis at all.

According to the present invention, the substituted silanes having the general formula $R_ySi(OR')_z$ are mixed with a "z" mole equivalent of an organic acid and heated preferably in the presence of free hydrogen ion, whereupon a displacement reaction takes place according to the following equation:

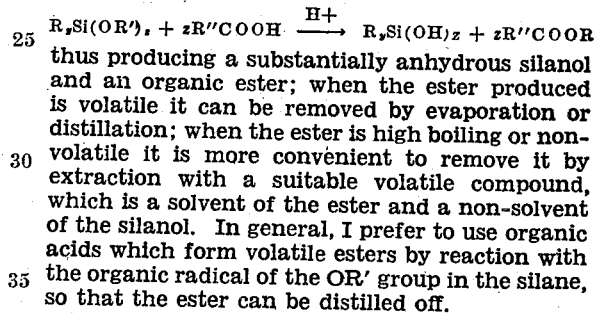

thus producing a substantially anhydrous silanol and an organic ester; when the ester produced is volatile it can be removed by evaporation or distillation; when the ester is high boiling or non-volatile it is more convenient to remove it by extraction with a suitable volatile compound, which is a solvent of the ester and a non-solvent of the silanol. In general, I prefer to use organic acids which form volatile esters by reaction with the organic radical of the OR' group in the silane, so that the ester can be distilled off.

The process is applicable of forming silanols from any substituted silane having the following general formula:

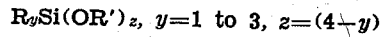

in which R and R' are aliphatic, aromatic or heterocyclic radicals. There may be given the following examples: triethyl methoxy silane, diethyl diethoxy silane, amyl tributoxy silane, dibenzyl dimethoxy silane, phenyl triethoxy silane, trimethyl phenoxy silane, triethyl 3-hydroxy pyridyloxy silane.

The acidolysis process can be effected by the use of any organic acid, either aliphatic or aromatic or monocarboxylic or dicarboxylic but there may be given by way of example some classes of acids which are more convenient to use than are others such, for example, as aliphatic organic acids such, for example, as formic, acetic, propionic, oleic, stearic, abietic, adipic; hydroxy organic acids such, for example, as glycolic, malic, lactic, and the like; dicarboxylic acids such, for example, as maleic, citric, tartaric, and the like; aromatic acids such as benzoic, salicylic, phthalic, and the like alicyclic acids such, for example, as hexahydrobenzoic acid, and the like. Generally speaking, I prefer to employ those organic acids which by reaction with the silane produce an ester capable of being distilled at atmospheric or slightly reduced pressure such, for example, as the lower aliphatic acids, namely, formic, acetic, propionic, and the like. On the other hand, when the ester produced is so high boiling that it is not convenient to remove it by distillation, the ester may be removed by extraction by a suitable organic volatile solvent which is a non-solvent of the silanol, such, for example, as methyl and ethyl alcohol.

Where the ester produced is a liquid or solid having plasticizing properties such, for example, as the phthalates, stearates, abietates, and the like, part or all may be allowed to remain in the reaction product and act as a plasticizer for the silanol or any polymer formed therefrom.

I have discovered that the acidolysis is best effected in an acid medium, i. e., containing free hydrogen ion. The hydrogen ion may be provided by adding in addition to the organic acid reagents, an inorganic acid or acid salt or by producing the hydrogen ion in situ by adding a substance which reacts in the system to produce $H^+$ ion. For the inorganic acid catalyst there may be used, for example, hydrochloric, sulfuric, phosphoric, etc., and as the acid salts, there may be used, for example, sodium acid sulfate, sodium dihydrogen phosphate, sodium acid sulfite, ammonium bifluoride and the like. To produce the $H^+$ ion in situ one may add to the reaction mixture a halide of an amphoteric metal such, for example, as a fluoride, chloride, bromide, and iodide of aluminum, zinc, tin, iron, boron and the like; all of which form a coordination complex with some of the organic acid reagent, which complex ionizes more highly than the organic acid alone and increases the acidity of the reaction mixture. For example, boron trifluoride associates with acetic acid and renders the reaction mixture strongly acid. Without attempting a theoretical explanation, it is a fact that the acidolysis is materially accelerated by the addition of small amounts, up to 2 per cent, of an acid catalyst.

Since the silanols produced frequently condense with themselves spontaneously to form polysiloxanes, the term "reaction product" is used in the appended claims to include the silanols and the polymers thereof.

The process of hydrolysis and acidolysis can be carried out together. For example, where it is desirable to use a mixture of a silane of the type $R_ySiX_z$ in which X is halogen, with a silane of the type $R_ySi(OR')_z$, the halosilane can be readily hydrolysed by mere mixing with water, which leaves the other silane $R_ySi(OR')_z$ unchanged. If, before, simultaneously or after the hydrolysis, the organic acid and an acid catalyst be added, then the silane of the type $R_ySi(OR')_z$ can be converted to the silanol by acidolysis. Likewise, two or more alkoxy silanes can be simultaneously hydrolysed and converted to the silanol.

It is apparent from the general reaction given that water is not added to the reaction mixture nor is water produced as a by-product so that the silanol is produced initially in the substantially anhydrous form. The elimination of water results in substantial economies being effected in the use of the "reaction product," particularly when they are formed in situ or within a material. For example, a textile fabric is padded with a mixture of the organic acid and catalyst, then coated or printed with the silane and finally dried. During the drying operation, the ester is evaporated and the silanol is produced in situ. Further heating of the cloth will result in the polymerization of the silanol to the corresponding siloxane. In this way a fabric may be rendered water-repellent or waterproof in a simple and direct manner.

EXAMPLE I

*Acidolysis of mono-amyl-triethoxysilane with formic acid*

|  | Mole. Weight | Grams Used | Moles Used |
|---|---|---|---|
| $C_5H_{11}Si(OC_2H_5)_3$ | 234.27 | 58.5 | ¼ |
| HCOOH | 46.03 | 34.5 | ¾ |

34.5 grams of formic acid and 58.5 grams of mono-amyl-triethoxysilane were placed in a flask along with .5–1 gram of paratoluene sulfonic acid as the catalyst. A reaction started to take place immediately before any heat was applied. The reaction mixture was refluxed for 30 minutes before distilling off the ethyl formate that was formed. 55 grams of the ester boiling between 54–64° C. was collected (practically the theoretical quantity). 50.5 grams of a mixture of mono-amyl-silantriol and polyamylsiloxane remained as a white viscous liquid which upon further heating became a plastic solid.

EXAMPLE II

*Acidolysis of mono-amyl-triethoxysilane with acetic acid-$BF_3$ Cpd.*

Boron fluoride gas was allowed to pass into acetic acid until one mole reacted with 2 moles of acetic acid to form acetic acid-boron fluoride coordination complex as a result of which the solution became strongly acid.

140.5 grams of acetic acid-$BF_3$ and 117 grams of mono-amyl-triethoxysilane were refluxed together for one hour. Most of the ethyl ester formed was present as a coordination complex with $BF_3$. 180 grams of the ethyl acetate and $BF_3$ complex was distilled. 53.5 grams of a mixture of amylsilanetriol and polyamylsiloxane was obtained.

EXAMPLE III

*Acidolysis of mono-amyltriethoxysilane with benzoic acid*

|  | Mole. Weight | Grams | Moles |
|---|---|---|---|
| $C_5H_{11}Si(OC_2H_5)_3$ | 234.27 | 58.5 | ¼ |
| $C_6H_5COOH$ | 122.0 | 91.6 | ¾ |

58.5 grams of mono-amyltriethoxysilane and 91.6 grams of benzoic acid were refluxed together for one hour. One gram of paratoluenesulfonic acid was used as the acid catalyst. 63 grams of ethyl benzoate was recovered by distillation, 50.5 grams of viscous polymer remained.

EXAMPLE IV

*Mono-amyltriethoxysilane and phthalic acid*

58.5 grams of mono-amyltriethoxysilane and 62.3 grams of phthalic acid were refluxed together for two hours. One gram of $H_2SO_4$ was used as a catalyst. After refluxing for two hours, the reaction mixture was allowed to cool. The diethyl phthalate ester formed was left in combination with the silanol, so that when a polysiloxane was formed, the ester served as a plasticizer. However, if desired, the ester can be extracted with a selective solvent such as methyl alcohol.

EXAMPLE V

The process of Example III was repeated but a molecular equivalent of maleic acid was substituted for the benzoic acid. The yield was substantially equivalent to the yield of Example III.

EXAMPLE VI

The process of Example III was repeated but a molecular equivalent of lactic acid was substituted for the benzoic acid with similar results.

EXAMPLE VII

One mole of monoethyl triethoxy silane was refluxed with an amount of acetic acid in slight excess of 3 moles and one gram of hydrochloric acid as a catalyst. After 2 hours the reaction mixture was heated to distil the ethyl acetate and the yield of monoethyl silanetriol was substantially theoretical.

EVAMPLE VIII

The process of Example VII was repeated using dimethyl diethoxy silane and slightly over 2 moles of propionic acid with similar results.

EXAMPLE IX

The process of Example VII was repeated using 1 mole of phenyl methyl diethoxy silane and slightly over 2 moles of citric acid. The diethyl citrate was extracted with methyl alcohol, and the yield of phenyl methyl silanediol was substantially theoretical.

EXAMPLE X

A piece of cotton fabric was dipped in a 10% solution of ammonium bifluoride and was allowed to dry until it contained about 25% moisture. It was then immersed in a solution containing:

| | Grams |
|---|---|
| Monoamyltriethoxysilicane | 130 |
| Ethyl silicate | 67 |
| Acetic acid | 110 |

The above solution was allowed to age for 24 hours. After immersing the fabric in this solution and obtaining a 100% pick up on the cloth, the cloth was placed in a hot air oven and allowed to dry until it contained about 40% volatile substance. The fabric was then ironed to dryness. When tested, the fabric showed excellent repellency both before and after washing well with soap and water.

EXAMPLE XI

Cotton fabric was treated with a 10% solution of ammonium bifluoride. When a 100% pick up was obtained on the fabric, it was allowed to dry until 25% moisture remained. The fabric was then immersed in a solution containing:

| | Grams |
|---|---|
| Acetic acid (glacial) | 90 |
| Monoamytriethoxysilicane | 170 |

The above solution was allowed to age for 24 hours. A 100% pick up was obtained on the cloth. It was then placed in a hot air oven and allowed to dry until it contained about 40% volatile substances. At this stage it was ironed to dryness.

The fabric was tested and showed very good water-repellency both before and after washing and redrying.

EXAMPLE XII

A cotton fabric was impregnated with a mixture of monoethyl triethoxy silane and 3 moles of acetic acid and 2 grams of boron fluoride as a catalyst. After allowing the material to soak for 2 hours at 60°, the cloth was dried to drive off the ethyl acetate and then further heated to 150° C. to advance the polymerization of the monoethyl siloxane. As a result of this treatment the cloth acquired durable water-repellent finish.

The above examples have been given merely to indicate the scope of the application of the invention. It is to be understood that instead of the specific silanes mentioned, other silanes of the classes described may be substituted, and for the particular acids employed as the reagent, other organic acids may be employed in a similar manner.

I claim:
1. The method for the preparation of a silanol which comprises heating a substantially anhydrous mixture containing an organic carboxylic acid and a silane having the generic formula $R_ySi(OR')_{4-y}$, in which generic formula R and R' are hydrocarbon substituents selected from the group consisting of aromatic and alkyl radicals and $y$ is an integer from one to three, the said reaction mixture containing as a reaction catalyst a material selected from the group consisting of para-toluene sulfonic acid, strong inorganic acids, acid salts of strong inorganic acids and halides of amphoteric metals.
2. The method of claim 1 in which R and R' are alkyl radicals.
3. The method of claim 2 in which the reaction catalyst is a strong inorganic acid.
4. The method of claim 3 in which the strong inorganic acid is sulfuric acid.
5. The method of claim 4 in which the sulfuric acid comprises up to about 2% of the reaction mixture.
6. The method of claim 3 in which the strong inorganic acid is phosphoric acid.
7. The method of claim 6 in which the phosphoric acid comprises up to about 2% of the reaction mixture.
8. The method of claim 2 in which the reaction catalyst is para-toluene sulfonic acid.
9. The method of claim 8 in which the para-toluene sulfonic acid comprises up to about 2% of the reaction mixture.

FRANK J. SOWA.

REFERENCES CITED

The following references are of record in the file of this patent:

UNITED STATES PATENTS

| Number | Name | Date |
|---|---|---|
| 2,058,844 | Vaughn | Oct. 27, 1936 |
| 2,182,208 | Nason | Dec. 5, 1939 |
| 2,212,992 | Sowa | Aug. 27, 1940 |
| 2,276,094 | Rothrock | Mar. 10, 1942 |
| 2,375,998 | McGregor et al. | May 15, 1945 |
| 2,384,384 | McGregor et al. | Sept. 4, 1945 |
| 2,390,370 | Hyde | Dec. 4, 1945 |
| 2,398,187 | McGregor et al. | Apr. 9, 1946 |